(12) United States Patent
Kurematsu et al.

(10) Patent No.: US 7,537,044 B2
(45) Date of Patent: May 26, 2009

(54) GUIDE FOR TRANSMISSION DEVICE

(75) Inventors: Yuji Kurematsu, Osaka (JP); Toshihiko Komiyama, Osaka (JP); Kenji Mitsuhashi, Osaka (JP); Toshiji Aota, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 104 days.

(21) Appl. No.: 11/481,361

(22) Filed: Jul. 5, 2006

(65) Prior Publication Data
US 2007/0029696 A1    Feb. 8, 2007

(30) Foreign Application Priority Data
Aug. 5, 2005    (JP)    ............... 2005-228566

(51) Int. Cl.
*B22D 17/22* (2006.01)
*B22D 33/04* (2006.01)
(52) U.S. Cl. ...................... 164/137; 164/342
(58) Field of Classification Search ................. 164/137, 164/339–343, 131
See application file for complete search history.

(56) References Cited
U.S. PATENT DOCUMENTS
4,592,405 A * 6/1986 Allen .......................... 164/120
5,117,894 A    6/1992 Katahira
5,222,917 A * 6/1993 Shimaya et al. ............. 474/101

FOREIGN PATENT DOCUMENTS

| | | | |
|---|---|---|---|
| JP | 61232053 A | * | 10/1986 |
| JP | 02059141 A | * | 2/1990 |
| JP | 04004961 A | * | 1/1992 |
| JP | 07-214274 | | 8/1995 |
| JP | 2540899 | | 4/1997 |
| JP | 001-153195 | | 6/2001 |
| JP | 2001153195 | | 6/2001 |
| JP | 2001-219259 | | 8/2001 |
| JP | 2002234051 | | 8/2002 |
| JP | 2004195791 | | 7/2004 |

OTHER PUBLICATIONS
U.S. Appl. No. 11/370,763.

* cited by examiner

*Primary Examiner*—Kuang Lin
(74) *Attorney, Agent, or Firm*—Howson & Howson LLP

(57) ABSTRACT

A guide for a traveling transmission medium such as a timing chain comprises a resin shoe for sliding contact with the transmission medium, supported on a base frame having an two flanges and a web in an I-shaped cross-section. The base frame is produced from aluminum by die casting, using a three-part mold. Two parts of the mold cooperate to form a part of the mold cavity that forms one of the flanges and the web of the base frame, and a third part of the mold cooperates with the first two parts to form a part of the cavity in which the other flange of the base frame is formed without a draft.

3 Claims, 6 Drawing Sheets

GUIDE FOR TRANSMISSION DEVICE

CROSS-REFERENCE TO RELATED APPLICATION

This application claims priority on the basis of Japanese patent application 2005-228566, filed Aug. 5, 2005. The disclosure of Japanese application 2005-228566 is hereby incorporated by reference.

FIELD OF THE INVENTION

This invention relates to a guide for a traveling transmission medium such as a roller chain, silent chain or the like, used to transmit power from a driving sprocket to one or more driven sprockets in a mechanism such as the timing drive of an internal combustion engine. The guide is maintained in sliding contact with the traveling transmission medium, and can be used to guide the transmission medium along its path of travel, or to guide and, at the same time, maintain proper tension in, the transmission medium. The invention relates more particularly to improvements in the method of manufacture of the guide, and particularly the base frame of the guide.

BACKGROUND OF THE INVENTION

A typical guide takes the form of a tensioner lever, which typically consists of a die-cast aluminum arm or base frame, pivotable at one end, and a resin shoe supported on the base frame and on which the transmission medium slides. The lever is pressed against the transmission medium by the plunger of a tensioner to maintain proper tension in the medium. An example of such a tensioner lever is described in U.S. Pat. No. 5,222,917, As shown in FIG. 6 of the present application, the typical tensioner lever 500 comprises a resin shoe 510 on which a timing chain slides, the shoe being mounted on a die cast aluminum base frame 520, having an I-shaped cross-section as seen in FIG. 8. The base frame 520 of the conventional tensioner lever 500 is formed in a mold, as shown in FIG. 7. The mold is composed of two parts, P1 and P2, which form an elongated mold cavity, having an I-shaped cross-section, in which the base frame is cast. These two parts, P1 and P2, are separable from each other along the direction indicated by arrows X, which is transverse to its direction of elongation of the mold cavity, but generally parallel to the upper part 521a of the mold cavity, on which the shoe-supporting surface 521 of the base frame, as seen in FIG. 8, is formed. The mold is formed with oppositely sloping drafts on opposite sides a mold parting line PL, where parts P1 and P2 of the mold meet. The drafts form a tapered configuration that facilitates opening of the mold. However, the drafts also form a central peak in the mold cavity 520', which in turn forms a central peak in the shoe-supporting surface 521 of the base frame, as seen in FIG. 8. When the shoe is mounted on the base frame, as shown in FIG. 8, the shoe becomes unstable, and can incline toward one side or the other of the I-shaped base frame. As a result, in the operation of the guide, smooth travel of the traveling transmission medium can be impaired, the shoe can wear unevenly, and unintended disengagement of the shoe from the base frame can occur.

Because of the peaked shape of the shoe-supporting surface of the die-cast base frame as it comes out of the mold, before the shoe is attached to the base frame, the drafts on the shoe-supporting surface 521 of the base frame must be removed by cutting or machining so that the transverse cross-sections of the surface become straight. The necessity for carrying out the cutting or machining step increases the labor required to produce the guide. Moreover, since there is a possibility that the machining or cutting will not be carried out accurately, it is also possible that the shoe-supporting surface will not have the desired contour. Because the drafts produced in the process of casting the base frame must be removed by machining or cutting, more material is required, and therefore the initial weight of the casting is increased. The entire increased weight is not necessarily removed in the cutting or machining step. Furthermore, since, in the process of casting the conventional base frame 520, the mold is opened after the base frame has cooled, thermal shrinkage can occur, and loads applied during separation of the mold parts P1 and P2 can cause distortion of the casting, and also shorten the life of the mold.

This invention addresses the above-mentioned problems, and provides a guide exhibiting one or more of several advantages, including simplification or elimination of the cutting or machining step following casting, achievement of enhanced accuracy, weight reduction, stable mounting of the shoe on the base frame, reduced resistance to opening of the mold parts, and an increase in the useful life of the mold.

SUMMARY OF THE INVENTION

In accordance with the invention, an elongated base frame for supporting a resin shoe in a guide for an endless, flexible, traveling, transmission medium is cast in a mold. The base frame has an I-shaped cross-section with first and second flanges connected by a web. The base frame is made by bringing together first, second and third die parts to form an elongated die cavity, preferably having an I-shaped cross-section. Molten metal, typically aluminum or aluminum alloy, is then poured into the die cavity, thereby casting the base frame. The cast base frame is then removed from the die cavity by separating the die parts. The first and second die parts are movable toward and away from each other along a first direction, and have openings facing each other. The first and second die parts cooperatively form a part of the die cavity in which the second flange and the web of the base frame are cast. The third die part is movable toward and away from the first and second die parts along a second direction transverse to the first direction, and the first, second and third parts cooperatively form a part of the die cavity in which the first flange is formed. The third die part has a continuous face against which the front surface of the first flange is formed, the continuous face being substantially straight in cross-section planes to which the direction of elongation of the die cavity is perpendicular.

Preferably, the removal of the cast base frame from the die cavity by separating the die parts is carried out while the base frame is in a semisolidified state.

The invention avoids the formation of a draft, or oppositely pitched drafts, on the front surface of the base frame, and the mold has no parting line meeting the front surface of the first flange, and the transverse cross-sections of the front surface of the first flange are straight. There is no need for cutting or machining to remove drafts, and therefore, the production cost of the guide can be significantly reduced. The weight of the base frame can also be reduced, since it is unnecessary to make the casting large in order to allow for machining of the shoe-engaging surface to a flat condition. Furthermore the invention allows the contour of the shoe-engaging surface to be formed accurately, and ensures stable mounting of the shoe Finally, resistance to opening of the mold is significantly reduced by utilization of a three-part mold, the dimensional accuracy of the base frame is improved by avoidance of distortion, and the useful life of the mold parts is also increased.

Additionally, when the base frame is removed from the mold while a semisolidified state, the effects of thermal shrinkage can be avoided, the mold can be opened smoothly without the need for drafts, excessive loads on the mold parts during opening of the mold are avoided, and the useful life of the mold is still further improved.

DETAILED DESCRIPTION OF THE PREFERRED EMBODIMENT

The invention can be used to make a movable guide, i.e., a tensioner lever for maintaining tension in a timing chain or the like in an engine, or as a fixed guide to control the path of travel of a timing chain or other traveling chain.

Figure 1:
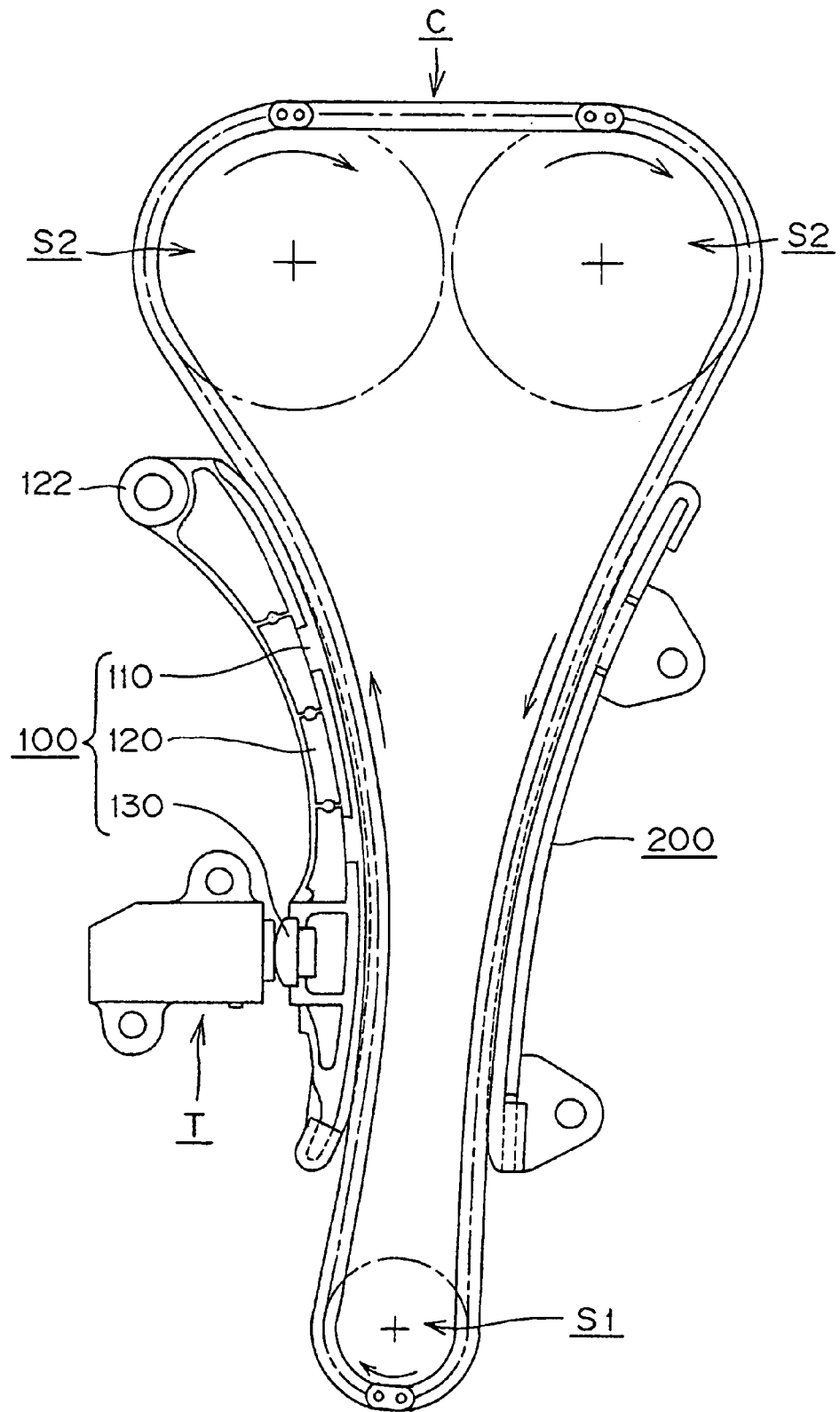
FIG. 1 is a schematic elevational view of an engine timing transmission incorporating a guide in accordance with the invention.

As shown in FIG. 1, a guide 100 is used in an automobile engine timing drive, in which power is transmitted by a timing chain C from a crankshaft sprocket S1 to a pair of camshaft sprockets S2. The guide 100 is a movable guide having a mounting hole 122, adjacent one of its ends, which receives a pivot shaft (not shown) on which the guide is pivoted. The pivot shaft is typically mounted on the exterior of an engine block. The guide cooperates with a tensioner T to maintain tension in a portion of the timing chain C which moves from the crankshaft sprocket to the camshaft sprockets. This portion of the chain which travels in sliding contact with a resin shoe 110 which forms part of the guide. The tensioner T applies an appropriate force to the guide 100 to prevent a transmission fault due to excessive tensioning or loosening of the chain C. A fixed guide 200 is also mounted on the engine block wall to guide the side of the timing chain which returns from the camshaft sprockets to the crankshaft sprocket.

Figure 2:
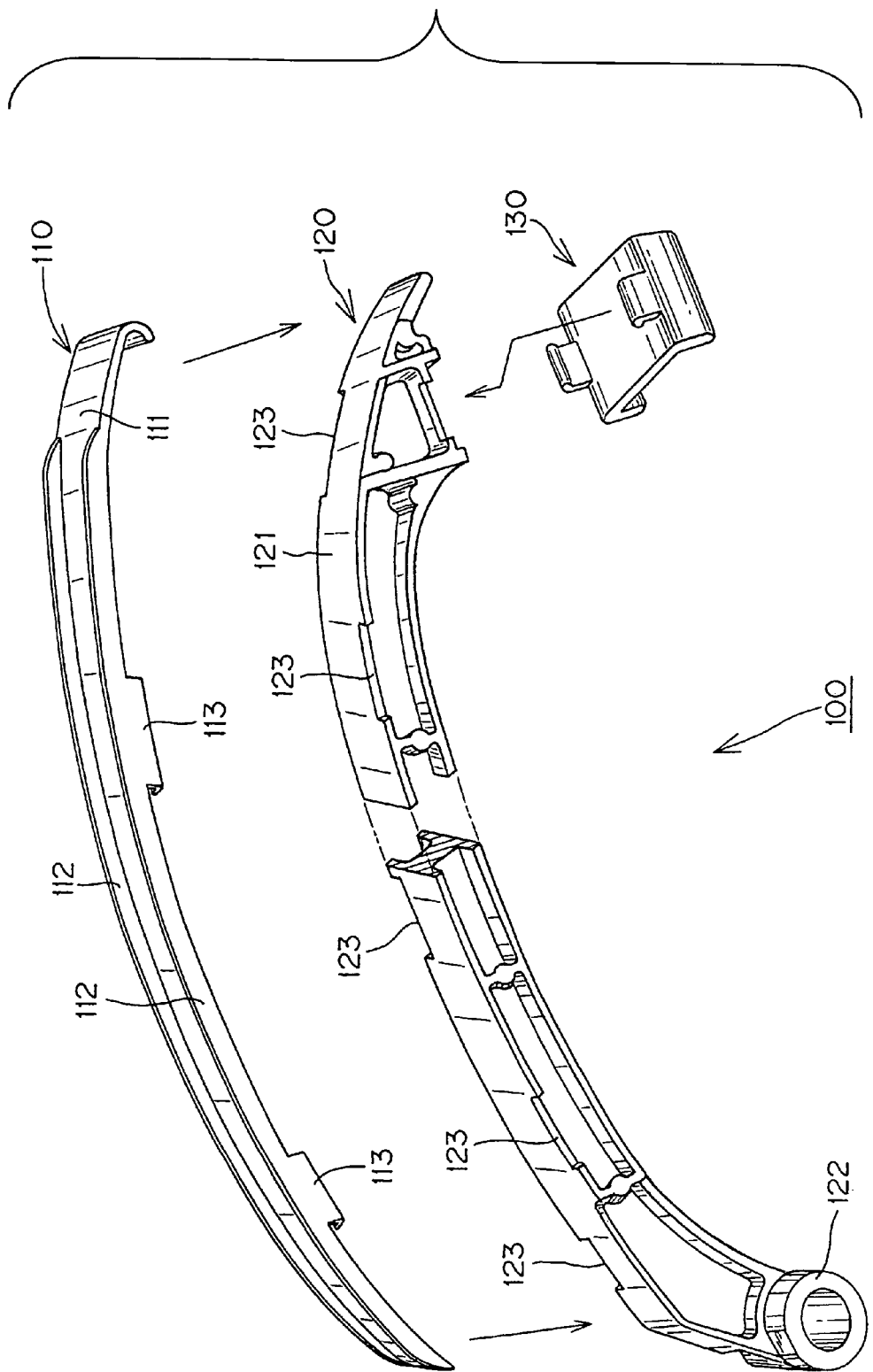
FIG. 2 is an exploded perspective view, partly in cross-section, of the guide.
Figure 3:
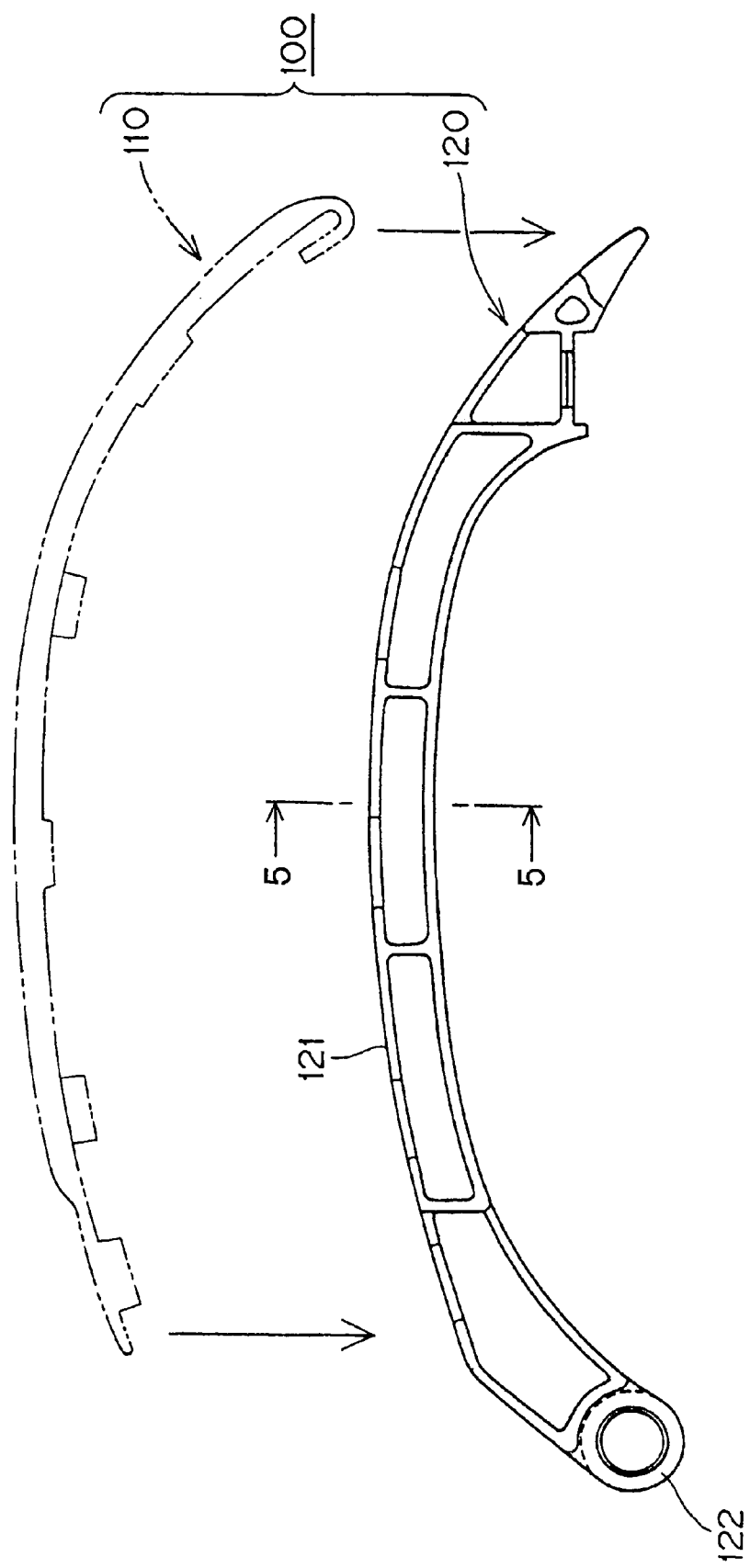
FIG. 3 is an exploded side elevational view showing the base frame and shoe.

As shown in FIG. 2, in the guide 100, the resin shoe 110 has an elongated, substantially arc-shaped, sliding contact surface 111 for sliding engagement with the chain C. The shoe is mounted on a base frame 120, having two flanges connected by a web and formed with an I-shaped cross-section. One of the flanges has an elongated shoe-supporting surface 121, which engages and supports the back side of the resin shoe 110 of the guide. A resin pad 130 is mounted on the base frame at a location remote from the mounting hole 122, for engagement with the plunger of the tensioner T. This pad 130 prevents transmission faults due excessive tensioning or loosening of the timing chain C.

As shown in FIG. 2, the resin shoe 110 includes a side wall guard 112, along the arc-shaped sliding contact surface 111. This guard prevents snaking travel of the timing chain C. Hooks portions 113, formed on the shoe, are attachable to both sides of the upper flange of the base frame 120 to hold the shoe in engagement with the base frame. The hooks extend into recesses 123 formed in the edges of the upper flange of the base frame to prevent longitudinal movement of the shoe relative to the base frame.

Figure 4:
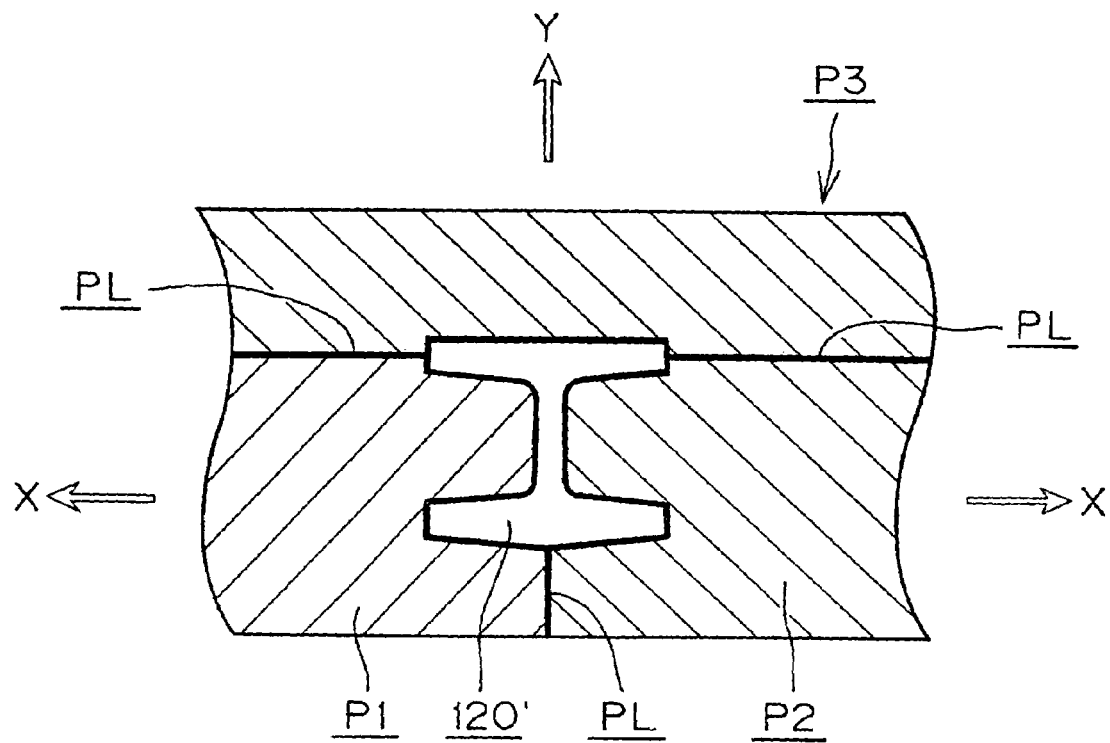
FIG. 4 is a cross-sectional view of the mold used in accordance with the invention.
Figure 5:
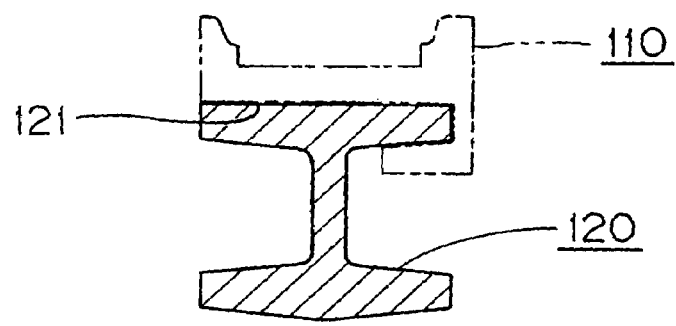
FIG. 5 is a cross-sectional view of a die cast base frame taken on plane 5-5 in FIG. 3.
Figure 6:
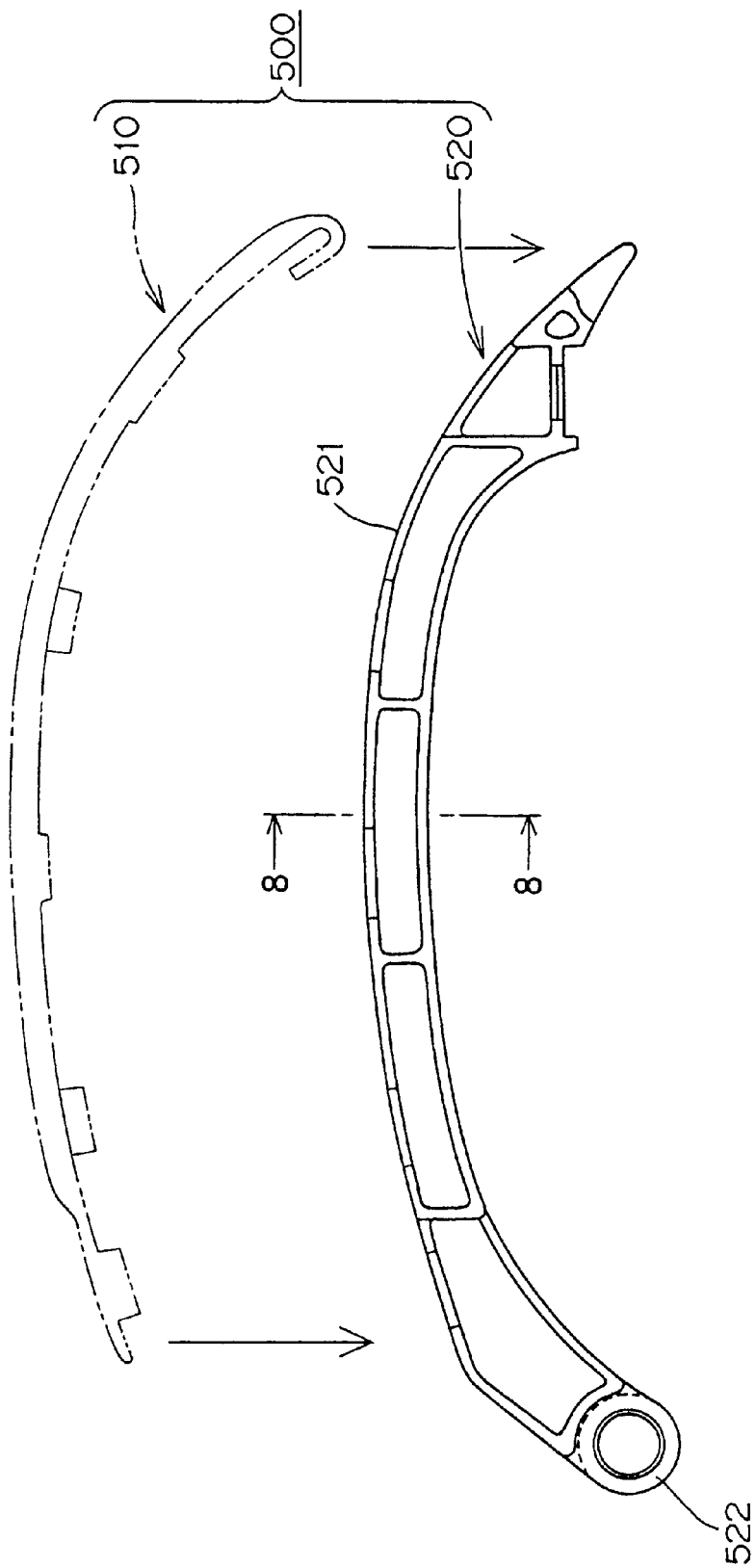
FIG. 6 is an exploded side elevational view of a base frame and shoe in a conventional tensioner lever.
Figure 7:
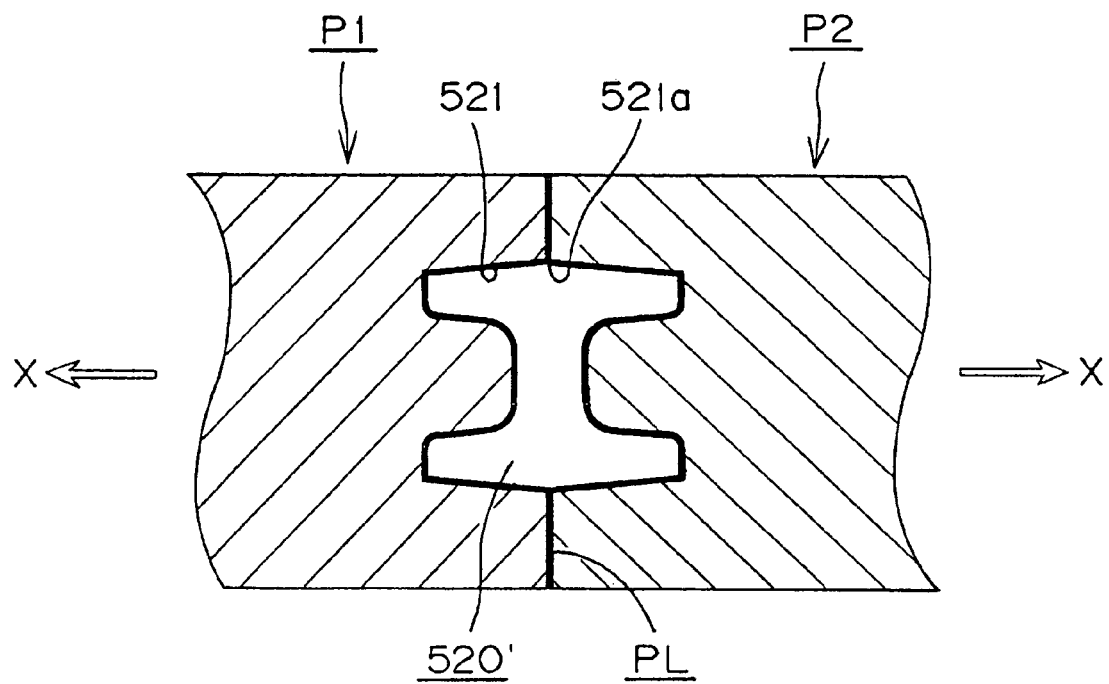
FIG. 7 is a cross-sectional view of a conventional mold.
Figure 8:
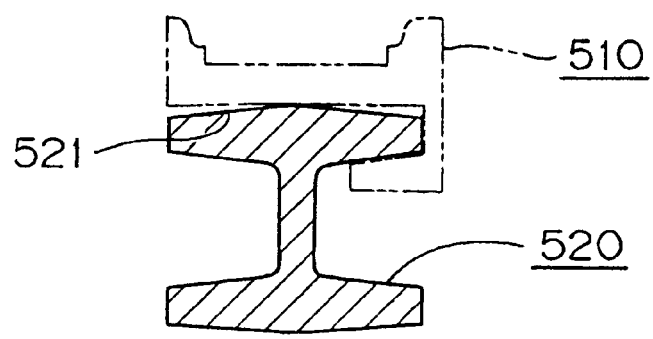
FIG. 8 is a cross-sectional view of a conventional die cast base frame, taken on section plane 8-8 in FIG. 6.

As shown in FIGS. 4 and 5, the base frame 120 is die cast from aluminum, or aluminum alloy, in a mold cavity 120' formed by a pair of lower mold parts P1 and P2 and an upper mold part P3. The two lower mold parts P1 and P2 are movable toward and away from each other in a direction indicated by arrows X in FIG. 4, and have openings which come together to form the parts of the cavity 120' in which a lower flange and the web of the base frame are cast. The upper mold part P3 is movable toward and away from parts P1 and P2 along a direction indicated by arrow Y, which is transverse to the direction indicated by arrows X. The upper mold part cooperates with the lower mold parts to form the part of the mold cavity in which the upper flange of the base frame is cast.

The mold parts P1 and P2 are respectively separable from each other by movement in the directions of arrows X, while the upper mold part P3 is separable from parts P1 and P2 by movement in the direction of arrow Y. Thus the construction of the mold permits three-directional splitting. However, either of mold parts P1 and P2 can be fixed, and it is even possible for mold part P3 to be fixed if parts P1 and P2 are movable downward as wall as away from each other.

The mold parts come together at parting lines PL in FIG. 4. The horizontal parting lines PL at which the upper mold part P3 meets the lower parts P1 and P2 preferably meet intermediate parts of the side edges of the upper part of the mold cavity 120', in which the upper flange of the base frame is cast.

As shown in FIG. 4, because the downwardly facing cavity-forming surface of part P3 is straight in cross-sectional shape, and continuous, drafts on the shoe-supporting surface at the top of the base frame are avoided, and parting lines of the mold do not intersect the shoe-supporting surface. Thus post-casting steps such as cutting, machining of the shoe supporting surface of the base frame are no longer necessary.

As is apparent from the cross-sectional view of the base frame 120 in FIG. 5, the resin shoe 110 is supported by the entire shoe-supporting surface 121, and a stable mounting of the shoe is achieved. The invention eliminates the possibility that the shoe will become tilted to one side or the other of a peak formed in the shoe-supporting part of the base frame where two opposite drafts meet.

The base frame 120 is preferably removed from the mold while it is still in a semisolidified state. If the base frame is semisolidified when removed from the mold, it is not subjected to the effects of thermal shrinkage at the mold-opening stage. As shown in FIGS. 4 and 5, even though no drafts are provided on the shoe-supporting surface of the base frame, since three-directional opening of the mold can be carried out smoothly, excessive loads on the mold parts during the opening of the mold are avoided, and the useful life of the mold can be extended.

With the use of the three-part mold as described, the base frame can be cast without a draft or drafts at the shoe-supporting surface, and without a parting line meeting the shoe-supporting surface. Cutting or machining of the drafts, as required in the case of a conventionally cast base frame, can be eliminated, and, as a result, the cost of production of the guide can be reduced significantly. As mentioned previously, a reduction in the weight of the base frame can also be achieved, as there is no need to provide excess material in order to accommodate the loss of material that occurs during cutting or machining of drafts on the shoe-supporting surface. Furthermore, the shoe-supporting surface of the base frame can be formed reliably with a highly accurate contour, and with a straight transverse cross-sectional shape. Moreover, resistance to opening of the mold parts is significantly reduced by the three-part mold, and the dimension accuracy of the base frame is improved by avoidance of distortion of the base frame, and the useful life of the mold can be improved.

We claim:

1. A method for die casting a base frame for supporting a resin shoe in a sliding contact guide for an endless, flexible, traveling, transmission medium, said base frame having a front surface for supporting engagement with a resin shoe, a back surface opposite from said front surface, said front and back surfaces both having elongated side edges, and said base frame having first and second side surfaces, the first side surface connecting a first side edge of the front surface with a first side edge of the back surface and the second side surface connecting a second side edge of the front surface with a second side edge of the back surface, the method comprising:

forming an elongated die cavity having the same shape as that of said base frame, the die cavity having front and back internal surfaces on which said front and back surfaces of the base frame are formed respectively, elongated internal edges at which said elongated side edges of the front and back surfaces of the base frame are formed, and first and second cavity side surfaces against which said first and second side surfaces of the base frame are formed, each of said first and second cavity side surfaces extending from one of said elongated internal edges to another of said elongated internal edges, the elongated die cavity being formed from three separable die parts by bringing two of said die parts into mutual contact with each other by relative movement in a first direction transverse to the direction of elongation of the die cavity, thereby forming a first parting line at the location at which said two die parts contact each other, said first parting line extending along the full length of the elongated die cavity, and bringing a third die part into contacting relationship with both of said two die parts by movement of said third die part relative to said first and second die parts in a second direction transverse to said first direction and to the direction of elongation of the die cavity, said third die part contacting the first and second die parts along second and third parting lines that meet the first and second side surfaces of the die cavity, respectively at intermediate locations between said front and back internal surfaces, the parting lines being spaced from said elongated internal edges along substantially the entire length of the die cavity; and casting the base frame in said elongated cavity by pouring molten metal into said die cavity;

said third die part having a continuous face against which the front surface of the base frame is formed, the intersections of said face with all cross-sectional planes which extend through the die cavity and to which the direction of elongation of the die cavity is perpendicular being substantially straight, thereby avoiding the formation of a draft on the front surface of the base frame.

2. A method for die casting an elongated base frame for supporting a resin shoe in a sliding contact guide for an endless, flexible, traveling, transmission medium, the base frame having first and second flanges connected by a web, the base frame having an I-shaped cross-section transverse to the direction of elongation of the base frame, and the first flange having a front surface for supporting engagement with a resin shoe, and a back surface opposite from said front surface, said front and back surfaces both having elongated side edges, and said base frame having first and second side surfaces, the first side surface connecting a first side edge of the front surface with a first side edge of the back surface and the second side surface connecting a second side edge of the front surface with a second side edge of the back surface, the method comprising:

assembling a die by bringing together first, second and third die parts to form an elongated die cavity having the same I-shaped cross-section as that of said base frame, the die cavity having front and back internal surfaces on which said front and back surfaces of the first flange of the base frame are formed respectively, elongated internal edges at which said elongated side edges of the front and back surfaces of the first flange of base frame are formed, and first and second cavity side surfaces against which said first and second side surfaces of the first flange of the base frame are formed, each of said first and second cavity side surfaces extending from one of said elongated internal edges to another of said elongated internal edges;

pouring molten metal into the die cavity, thereby casting the base frame; and removing the cast base frame from said die cavity by separating the die parts;

in which the first and second die parts are movable toward and away from each other along a first direction and have openings facing each other, the first and second die parts cooperatively forming a part of the die cavity in which second flange and the web of the base frame are cast, and, when together forming a first parting line extending the full length of the elongated die cavity;

in which the third die part is movable toward and away from the first and second die parts along a second direction transverse to said first direction, the first, second and third parts cooperatively forming a part of the die cavity in which the first flange is formed;

in which the third die part has a continuous face against which the front surface of the first flange is formed, the intersections of said face with all cross-sectional planes which extend through the die cavity and to which the direction of elongation of the die cavity is perpendicular being substantially straight, thereby avoiding the formation of a draft on the front surface of the base frame, and in which the third die part contacts the first and second die parts along second and third parting lines that meet the first and second side surfaces of the die cavity, respectively at intermediate locations between said front and back internal surfaces, the parting lines being spaced from said elongated internal edges along substantially the entire length of the die cavity.

3. The method according to claim 2, in which the step of removing the cast base frame from said die cavity by separating the die parts is carried out while the base frame is in a semisolidified state.

* * * * *